United States Patent
Bulgin et al.

(10) Patent No.: US 9,042,869 B2
(45) Date of Patent: May 26, 2015

(54) VOICEMAIL SYSTEM FOR A HANDHELD DEVICE

(75) Inventors: Scott E. Bulgin, Waterloo (CA); David J. Mak-Fan, Waterloo (CA); Lawrence E. Kuhl, Waterloo (CA)

(73) Assignee: BlackBerry Limited, Waterloo (CA)

( * ) Notice: Subject to any disclaimer, the term of this patent is extended or adjusted under 35 U.S.C. 154(b) by 2291 days.

(21) Appl. No.: 11/846,698

(22) Filed: Aug. 29, 2007

(65) Prior Publication Data

US 2009/0061827 A1 Mar. 5, 2009

(51) Int. Cl.
*H04M 11/10* (2006.01)
*H04M 1/65* (2006.01)
*H04M 3/533* (2006.01)

(52) U.S. Cl.
CPC ............ *H04M 11/10* (2013.01); *H04M 1/6505* (2013.01); *H04M 3/53333* (2013.01); *H04M 2203/253* (2013.01); *H04M 2207/18* (2013.01)

(58) Field of Classification Search
USPC .................................... 455/412.1, 412.2, 413
See application file for complete search history.

(56) References Cited

U.S. PATENT DOCUMENTS

| | | | |
|---|---|---|---|
| 5,003,576 A | 3/1991 | Helferich | |
| 5,894,594 A | 4/1999 | Kang | |
| 5,894,595 A * | 4/1999 | Foladare et al. | 455/556.2 |
| 6,233,320 B1 | 5/2001 | Haimi-Cohen | |
| 6,240,299 B1 | 5/2001 | Song | |
| 6,405,032 B1 * | 6/2002 | Buhrmann | 455/413 |
| 6,483,901 B1 | 11/2002 | Cuallo | |
| 6,693,995 B1 * | 2/2004 | Memos | 379/88.19 |
| 6,697,458 B1 | 2/2004 | Kunjibettu | |
| 6,751,300 B2 | 6/2004 | Muller | |
| 6,876,729 B1 | 4/2005 | Kuter et al. | |
| 6,879,822 B2 | 4/2005 | Silvester | |
| 7,035,666 B2 | 4/2006 | Silberfenig | |
| 2005/0191969 A1 * | 9/2005 | Mousseau | 455/90.2 |
| 2006/0094358 A1 | 5/2006 | Khalili | |
| 2006/0116111 A1 | 6/2006 | Klicpera | |
| 2007/0032225 A1 * | 2/2007 | Konicek et al. | 455/417 |
| 2007/0143495 A1 * | 6/2007 | Porat | 709/238 |
| 2008/0207176 A1 * | 8/2008 | Brackbill et al. | 455/413 |

FOREIGN PATENT DOCUMENTS

| WO | WO98/57481 | 12/1998 |
|---|---|---|
| WO | WO 99/16181 A1 | 4/1999 |
| WO | WO 00/62511 A1 | 10/2000 |
| WO | WO 2007/002753 A2 | 1/2007 |

* cited by examiner

*Primary Examiner* — Marcos Batista
(74) *Attorney, Agent, or Firm* — Steven Greenberg, Esq.; Donna Flores, Esq.; CRGO LAW

(57) ABSTRACT

A voicemail system utilizing a wireless handheld device with a suitable user interface for presenting voice messages and email messages is disclosed. Voice messages are received over a wireless network, and stored on the handheld device. Upon receipt of a voice message, the handheld device records the audio message in local memory. Subsequently a message record entry corresponding to the received audio message is displayed in a user interface screen of the handheld. When the user opens the displayed message record, the handheld device plays back the corresponding audio message stored in local memory.

30 Claims, 10 Drawing Sheets

600

| | | Thu. Dec. 28, 2006 | | 602 |
|---|---|---|---|---|
| 606A | 📧 | 11:00p Kuhl | Report | 604A |
| 606B | 📞 | 10:15p Scott | Voicemail | 604B |
| 606C | ✉️ | 10:00p Bulgin | Hello | 604C |
| 606D | ✉️ | 9:45p Mak-Fan | Notice | 604D |
| 606E | ✓ | 9:00p Jack | Hi | 604E |
| 606F | 📞 | 8:45p David | Voicemail | 604F |
| 606G | 📞 | 8:30p Scott | Voicemail | 604G |
| 606H | ✉️ | 8:00p Joe | Happy New Year | 604H |
| 606I | ✉️ | 7:50p Larry | | 604I |
| 606J | ✓ | 7:30p Larry | Read this | 604J |
| 606K | 📞 | 7:00p David | Voicemail | 604K |

FIG. 6

| | | Thu. Dec. 28, 2006 | | 602 |
|---|---|---|---|---|
| 606A | ✉ | 11:00p Kuhl | Report | 804A |
| 606B | ☏ | 10:15p Scott | Voicemail | 804B |
| | ☏ | 8:45p David | | 806A |
| | ☏ | 8:30p Scott | | 806B |
| | ☏ | 7:00p David | | 806C |
| 606C | ✉ | 10:00p Bulgin | Hello | 804C |
| 606D | ✉ | 9:45p Mak-Fan | Notice | 804D |
| 606E | ✓ | 9:00p Jack | Hi | 804E |
| 606F | ☏ | 8:45p David | Voicemail | 804F |
| | ☏ | 8:30p Scott | | 806D |
| | ☏ | 7:00p David | | 806E |
| 606G | ☏ | 8:30p Scott | Voicemail | 804G |
| | ☏ | 7:00p David | | 806F |
| 606H | ✉ | 8:00p Joe | Happy New Year | 804H |
| 606I | ✉ | 7:50p Larry | | 804I |
| 606J | ✓ | 7:30p Larry | Read this | 804J |
| 606K | ☏ | 7:00p David | Voicemail | 804K |

FIG. 8

VOICEMAIL SYSTEM FOR A HANDHELD DEVICE

BACKGROUND OF THE INVENTION

The present patent document relates generally to a voicemail system and more particularly to a voicemail system suitable for handheld communication devices.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyright rights whatsoever.

Handheld devices such as Personal Digital Assistants (PDAs), cellular phones, portable computing devices and other two-way data and/or voice communication devices are fast becoming ubiquitous. In particular, powerful handheld devices that allow both voice and data communication are now fairly common in certain businesses and government agencies. Such handheld communication devices are in high demand, as they permit voice and electronic communication, as well as management of personal and business related information using email, calendars, contacts and address books, all without impeding mobility. Popular handheld devices include those supplied by Research In Motion Ltd. of Waterloo, Ontario, Canada.

A number of communications services that are typically accessed through handheld devices preceded the proliferation of powerful handheld devices. As such, certain inherent deficiencies may be present that could be avoided with a re-design of the provisioned application to take the capabilities of the mobile handheld device fully into account.

A typical example of such a service is voicemail. Voicemail is designed as a service provisioned by a network provider. A user accesses his or her voicemail by calling into the network, keying in an appropriate authentication such as a mailbox number and password, and generally interacting with the voicemail system by inputting data, typically through a touchtone telephone interface, and receiving feedback through voice instructions.

This has several disadvantages. First, the user is not able to see at a glance how many messages are waiting, when they were received, and who may have sent them. The user must go though each message sequentially, listening to instructions and keying in responses, to answer questions and to make menu selections regarding whether to listen to the message, skip it, delete it or store it.

Secondly, since the user cannot see the messages, the user cannot skip to the messages that he is interested in. As a result, time is wasted dealing with messages not of current interest to the user. At a minimum, at least some time must elapse as the user listens to information about the sender before moving on to the next message, even when deciding to skip the current message.

Accessing voicemail as described above has served older telephone devices well, and has provided a degree of location independence. However, today's wireless digital handheld devices have far greater digital processing power and better screens that may be harnessed to provide a superior voicemail service.

Accordingly, there is a need for an improved voicemail system for handheld devices that improves ease of use, reduces unnecessary user input, and reduces network connection time.

BRIEF DESCRIPTION OF THE DRAWINGS

Aspects and features of the disclosed device and method will become apparent to those of ordinary skill in the art upon review of the following description of specific embodiments in conjunction with the accompanying figures. In the figures which illustrate example embodiments:

FIG. 6 is a screenshot of a user interface for a voicemail system exemplary of one embodiment disclosed herein, displaying voicemail messages together with email messages and text messages;

FIG. 8 is a screenshot of a user interface on a handheld device, for a voicemail system exemplary of another embodiment, displaying interrelated voicemail messages as threaded exchanges;

DETAILED DESCRIPTION

A method of providing a voicemail service at a handheld wireless device is provided. In one aspect, the method includes recording an incoming audio message in a local memory of the handheld device and displaying an incoming audio message record, corresponding to the incoming audio message, in a user interface screen of the handheld device. The user interface screen contemporaneously presents email message records along with the incoming audio message record.

In another aspect, there is provided, a method of providing a voicemail service at a wireless handheld device including recording an incoming audio message for an original caller in a local memory of the handheld device, and displaying an incoming audio message record corresponding to the incoming audio message in a user interface screen of the handheld device. The method involves, enabling a user to select to reply to the original caller upon the user selecting the incoming audio message record through the user interface. The method also involves, upon the user selecting to reply being connected to voicemail and leaving an outgoing audio message; recording the outgoing audio message in the local memory, creating an outgoing message record for the outgoing audio message, and associating the outgoing message record with the incoming audio message record.

In accordance with another aspect, a handheld device comprises a wireless receiver, an audio codec, a speaker, memory, a display; and a processor. Upon the receiver receiving a wireless phone call from a caller, the device enters answering-machine mode, and records an audio message from the caller in the memory. The processor and codec also add a message record, corresponding to the audio message, in a user interface screen used for presenting email message records, text message records, and the audio message record in the handheld device.

Figure 1:
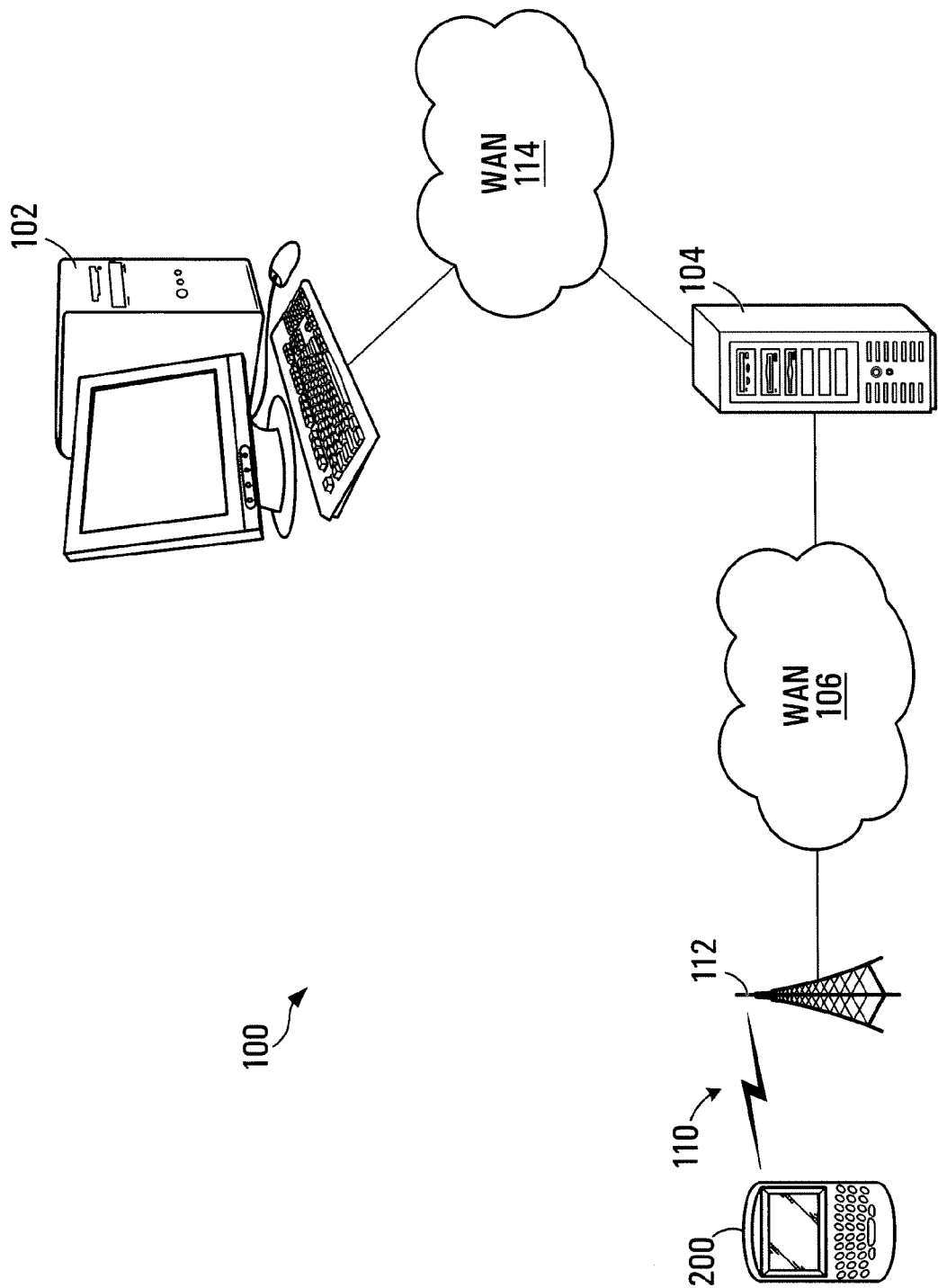
FIG. 1 is a schematic diagram depicting a typical networked environment in which a handheld computing device may be used.

FIG. 1 shows a schematic diagram depicting a typical networked environment 100 in which an exemplary handheld device 200 may be used. Networked environment 100 includes a desktop computing device 102, a server computer 104, a wide area network (WAN) 106, a communications network 110 and handheld device 200. Server 104 includes email server software, and is interconnected with a desktop computer 102 through a local area network (LAN) 114. Server 104 additionally includes software that facilitates access to the email server software by handheld device 200.

A radio frequency (RF) base station 112 provides a communication link between WAN 106, which may be the public Internet, and a communications network 110, which may be a wireless network. Handheld device 200 accesses data from server 104 or desktop computer 102 through the communications network 110 and WAN 106. In some network architectures, a firewall may be implemented between WAN 106 and server computer 104 to gate access to LAN 114, which may be a corporate LAN.

Handheld device 200 is loaded with email client software that accesses email messages stored in mail server software (such as Microsoft Exchange or Lotus Domino software) running on server 104. To facilitate data access by handheld device 200, server 104 may be loaded with specialized software to provide compression and encryption of data and a data interface with the mail server software.

Figure 2:
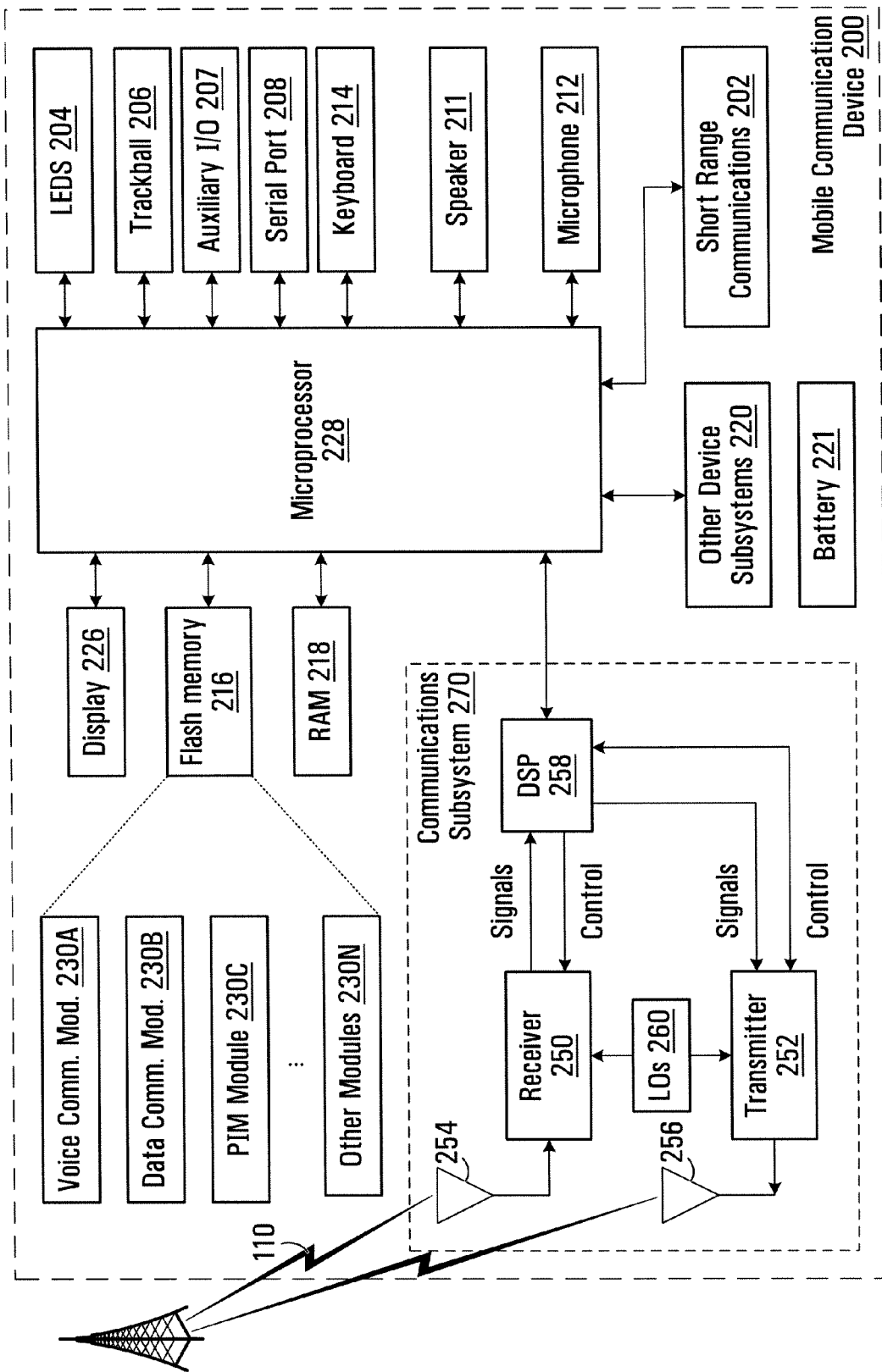
FIG. 2 is a block diagram of the various components of a handheld device.

FIG. 2 is a schematic diagram of exemplary handheld mobile communication device 200. Device 200 includes a housing, an input device (keyboard 214), and an output device (display 226), which may be a full graphic Liquid Crystal Display (LCD). Other types of output devices may alternatively be utilized. A processing device (microprocessor 228) is shown schematically in FIG. 2 as coupled between the keyboard 214 and the display 226. The microprocessor 228 controls the operation of the display 226, as well as the overall operation of the handheld device 200, in response to actuation of keys on the keyboard 214 by a user.

The housing may be elongated vertically, or may take on other sizes and shapes (including clamshell housing structures). The keyboard may include a mode selection key, or other hardware or software for switching between text entry and telephony entry.

In addition to the microprocessor 228, other parts of the handheld device 200 are shown schematically in FIG. 2. These include: a communications subsystem 270; a short-range communications subsystem 202; the keyboard 214 and the display 226, along with an input entry device such as a track ball 206 and other auxiliary input/output devices 207, a serial port 208, a speaker 211 and a microphone 212; as well as memory devices including a flash memory 216 and a random access memory (RAM) 218; and various other device subsystems 220. As is known, track ball 206 may be rotated to provide scrolling and pressed to allow selection. The handheld device 200 has a battery 221 to power the active elements of the handheld device 200. The handheld device 200 is preferably a two-way radio frequency (RF) communication device having voice and/or data communication capabilities. In addition, the handheld device 200 may have the capability to communicate with other computer systems via the Internet.

Operating system software executed by the microprocessor 228 is preferably stored in a persistent store, such as the flash memory 216, but may be stored in other types of memory devices, such as a read only memory (ROM) or similar storage element. In addition, system software, specific device applications, or parts thereof, may be temporarily loaded into a volatile store, such as the RAM 218. Communication signals received by the handheld device 200 may also be stored to the RAM 218.

The microprocessor 228, in addition to its operating system functions, enables execution of software applications on the handheld device 200. A predetermined set of software applications that control basic device operations, such as a voice communications module 230A and a data communications module 230B, are installed on the handheld device 200 during manufacture. The data communications module 230B allows the handling of email messages. In addition, a personal information manager (PIM) application module 230C is also installed on the handheld device 200 during manufacture. The PIM application is capable of organizing and managing data items, such as e-mail, calendar events, voicemails, appointments, and task items. The PIM application is also capable of sending and receiving data items via wireless network 110. The data items managed by the PIM application are seamlessly integrated, synchronized and updated via the wireless network with the device user's corresponding data items stored or associated with a host computer system. As well, additional software modules, illustrated as other software modules 230N, may be installed during manufacture.

Communication functions, including data and voice communications, are performed through the communication subsystem 270, and possibly through the short-range communications subsystem 202. The communication subsystem 270 includes a receiver 250, a transmitter 252 and one or more antennas, illustrated as a receive antenna 254 and a transmit antenna 256. In addition, the communication subsystem 270 also includes a processing module, such as a digital signal processor (DSP) 258, and local oscillators (LOs) 260. The specific design and implementation of the communication subsystem 270 is dependent upon the communication network in which the handheld device 200 is intended to operate. For example, the communication subsystem 270 of the handheld device 200 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communications Service (PCS), Global System for Mobile Communications (GSM), etc. Other types of data and voice networks, both separate and integrated, may also be utilized with the handheld device 200.

Network access requirements vary depending upon the type of communication system. For example, in the Mobitex™ and DataTAC™ networks, handheld devices 200 are registered on the network using a unique Personal Identification Number (PIN) associated with each device. In GPRS networks, however, network access is associated with a subscriber or user of a device. A GPRS device therefore requires a subscriber identity module, commonly referred to as a Subscriber Identity Module (SIM) card, in order to operate on a GPRS network.

When required network registration or activation procedures have been completed, the handheld device 200 may send and receive communication signals over the communication network 110. Signals received from the communication network 110 by the receive antenna 254 are routed to the receiver 250, which provides for signal amplification, frequency down conversion, filtering, channel selection, etc., and may also provide analog to digital conversion. Analog-to-digital conversion of the received signal allows the DSP 258 to perform more complex communication functions, such as demodulation and decoding. In a similar manner, signals to be transmitted to the network 110 are processed (e.g., modulated and encoded) by the DSP 258 and are then provided to the transmitter 252 for digital to analog conversion, frequency up conversion, filtering, amplification and transmission to the communication network 110 (or networks) via the transmit antenna 256.

In addition to processing communication signals, the DSP 258 provides for control of the receiver 250 and the transmitter 252. For example, gains applied to communication signals in the receiver 250 and the transmitter 252 may be adaptively controlled through automatic gain control algorithms implemented in the DSP 258.

In a data communication mode, a received signal, such as a text message or web page download, is processed by the communication subsystem 270 and is input to the microprocessor 228. The received signal is then further processed by the microprocessor 228 for an output to the display 226, or alternatively to some other auxiliary I/O devices 207. A device user may also compose data items, such as e-mail messages, using the keyboard 214, an input entry device such as a track ball 206 and/or some other auxiliary I/O device 207, such as a touchpad, a touch screen, a thumbwheel, a joystick, a rocker switch, or some other type of input entry device. The composed data items may then be transmitted over the communication network 110 via the communication subsystem 270.

In a voice communication mode, overall operation of the device is substantially similar to the data communication mode. However for voice communication a speech encoding step is involved at the transmitter and correspondingly a speech decoding step occurs at the receiver. At the transmitter, after analog-to-digital conversion of the output of microphone 212, digital voice samples are encoded by a speech coder before being modulated for transmission. In GSM networks for example, a GSM AMR (Adaptive Multi Rate) speech coder may be used to encode audio data for network transmission. Similarly, at the receiver, the network-encoded audio data may be decoded using the corresponding GSM AMR decoder. After the audio data is decoded, it is then converted to an analog signal by a digital-to-analog converter and output to a speaker, such as speaker 211. Variants such as Adaptive Multi Rate—Wide Band (AMR-WB) compliant speech coders may also be used in GSM networks. Other speech codecs, compliant to a suitable standard defined for the particular underlying voice and data communication network 110, may of course be used. Suitable speech codecs for a given voice and data communication network would be known to persons skilled in the art.

At the transmitter, audio signals are usually generated by a microphone 212. Alternative voice or audio I/O subsystems, such as a voice message recording subsystem, may also be implemented on the device 200. In addition, the display 226 may also be utilized in voice communication mode, for example, to display the identity of a calling party, the duration of a voice call, or other voice call related information.

The short-range communications subsystem 202 enables communication between the handheld device 200 and other proximate systems or devices, which need not necessarily be similar devices. For example, the short-range communications subsystem may include an infrared device and associated circuits and components, or a Bluetooth™ communication module to provide for communication with similarly-enabled systems and devices.

Handheld device 200, when operating under the control of known software, may be used to access voicemail messages from a conventional voicemail system provided by a network provider. The software may include device code (firmware), operating system software and a suite of software applications and processes.

Figure 3:
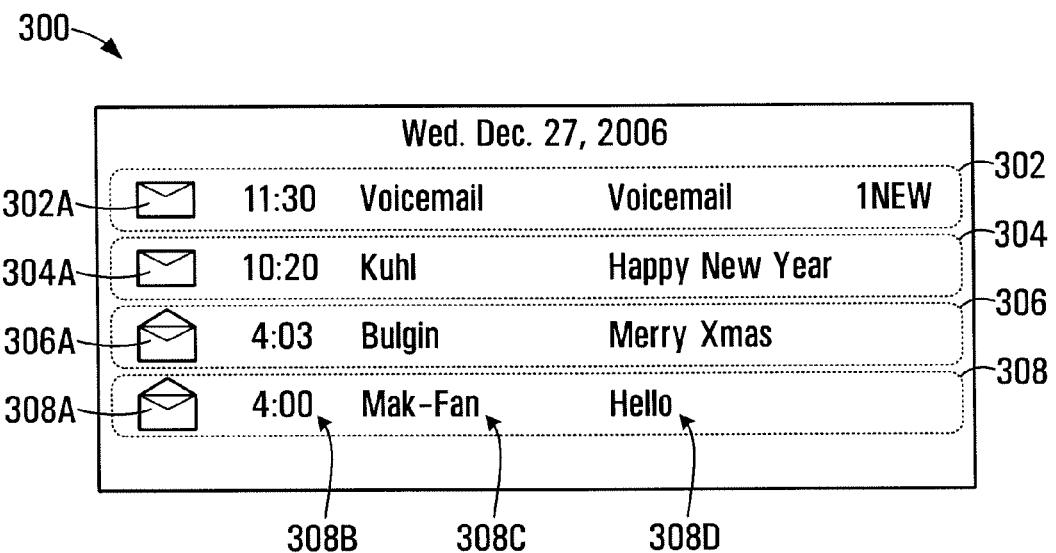
FIG. 3 is a screenshot of a user interface used in a conventional voicemail system executing on the handheld device of FIG. 2.
Figure 4:
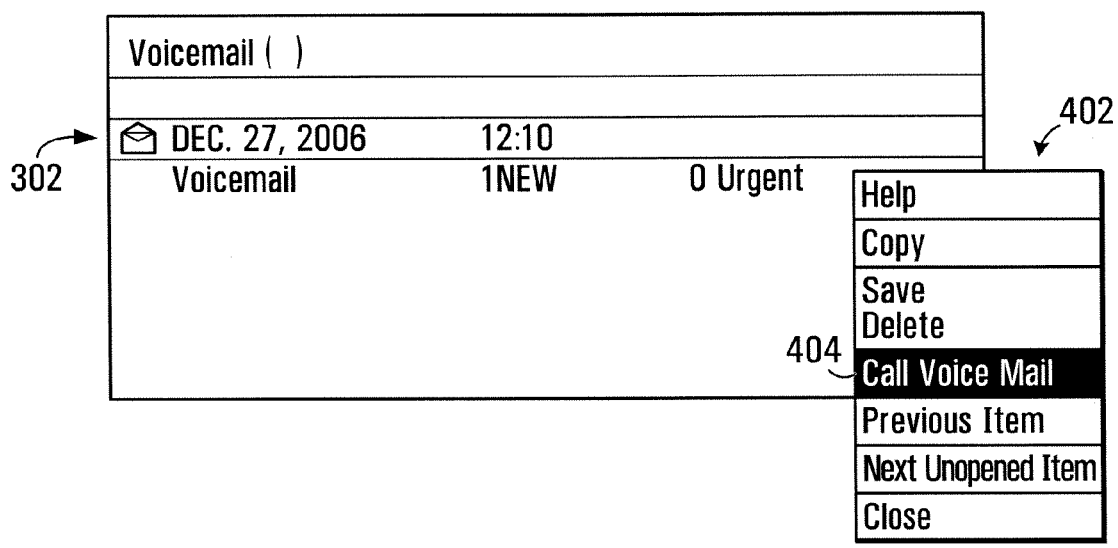
FIG. 4 is a further screenshot of a user interface used in a conventional voicemail system.
Figure 5:
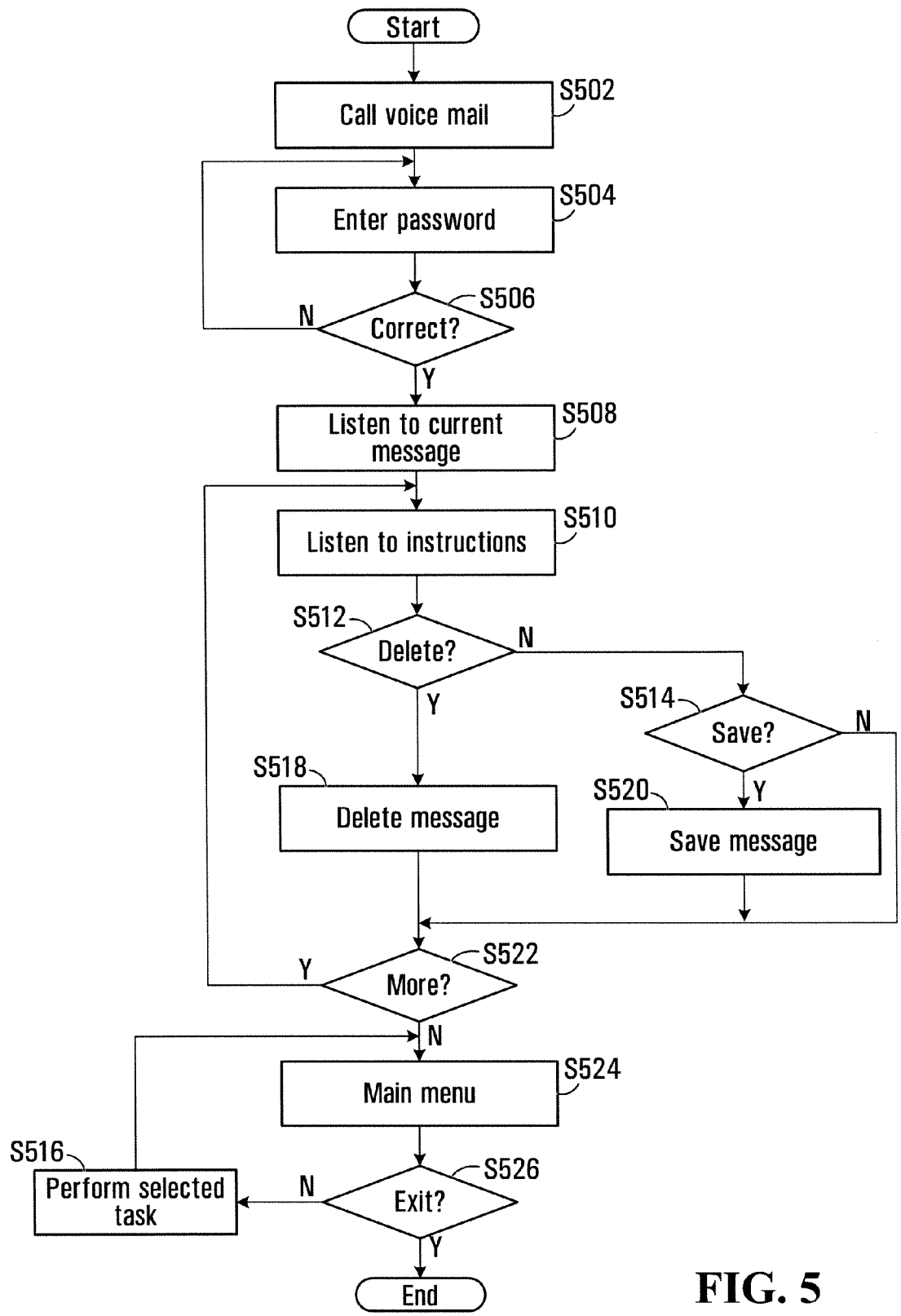
FIG. 5 is a flowchart depicting typical steps taken by a user, operating the handheld device of FIG. 2, to access his or her audio messages stored in a conventional voicemail system.

Typical steps taken by a user of a handheld device 200, to access voicemail messages from a conventional voicemail system are illustrated in FIGS. 3-5. Variations in the depicted sequence of actions, such as the use of voice commands instead of keyboard keys, or changes in the order of steps, are possible.

FIG. 3 depicts an exemplary typical user interface message screen 300 used on handheld device 200. Icon 302A visually indicates a record 302 for a voicemail message; icon 304A, a record 304 for a replied to email message; icon 306A, a record 306 for an opened email message; and icon 308A, a record 308 for an unread email message. Icon 302A and the title of message record 302, indicate that the message is a voicemail message (as opposed to an email or text message for example).

In addition to the icons, message records may contain other fields which provide information such as a time of arrival field, a sender identification field and a subject field. For example message record 308 contains a time field 308B, email sender id field 308C and a title or subject field 308D associated with the message corresponding to message record 308.

The user may bring up a pop-up menu screen 402 as depicted in FIG. 4, by using track ball 206 after opening message record 302 and navigate through the menu screen 402 to make a selection of a menu entry 404 using the track ball 206. It is noted that other input entry devices such as keyboard 214, or a touchpad, touch screen, joystick or the like may also employed to call up the menu screen 402 or navigate or make a selection of a menu entry 404. When menu entry 404 of popup menu 402 labeled "Call Voice Mail" is selected, the handheld device 200 makes a call to a conventional voicemail system provided by the wireless network provider. There is typically a dedicated phone number that is dialed to access the voicemail mailbox used by the particular handheld device 200 when entry 404 is selected.

FIG. 5 depicts a flowchart illustrating typical steps taken by a user operating a handheld device 200 to access his or her messages stored in a conventional voicemail system.

The user first calls into the telephone network using a wireless handheld device 200 (S502). This is done by dialing a number associated with his voicemail mailbox. Once the call successfully connects into the voicemail system, the user then supplies his password when prompted (S504).

All data entry is typically done using keys on a touchtone phone keypad. Data is presented to the user, via voice commands, through the speaker of the handset of handheld device 200. If the password is incorrect (S506) it must be re-entered (S504).

The user listens to the current message (S508). After hearing the current message, the user may listen to instructions (S510) and either press a key on an input entry device (e.g. pressing the track ball 206 or keyboard 214 or the like) to delete the message (S512, S518); press a different key to save the message (S514, S520) or simply skip the message. If more voicemail messages are available on the voicemail system (S522), the process may revert to S510. At S524 a "main menu" may be invoked. The user may perform the selected task (S516) such as setting configuration parameters, recording a greeting or setting the number of times a call should ring before going to the voicemail system. Alternately, the user may choose to listen to messages again starting at S510 using options in the main menu (S524).

Although, various conventional systems differ in their implementation, the use of a touchtone key and inspection of messages one-by-one is the norm in conventional voicemail systems. It is instructive to note that the user may call into the voicemail using an ordinary telephone handset and a traditional land-based telephone line instead of a wireless handheld device. Thus the voicemail system neither requires nor takes advantage of the many advantageous features in wireless handheld devices. Moreover, the voicemail system takes for granted the availability of a connection, which may not be the case when using wireless handhelds. If the user is not in a location that permits wireless communication and cannot access a land line, his voice messages are inaccessible. This is very undesirable, as the messages have already been stored. The voicemail thus achieves location independence at the cost of requiring a new wireless network connection, just for the purpose of accessing a stored message.

The lack of a visual interface to guide a user through the steps of FIG. 5 is also disadvantageous. In sharp contrast to other messaging applications that make full use of the screen provided on a handheld device such as email or text messaging, the user is not able to see at a glance information about the nature of voicemail messages, such as when a message was received, who may have sent it or the length of the message.

Moreover, as will be apparent from FIG. 5 the user must go though voicemail messages sequentially, inputting commands to indicate preferred actions such as whether to listen to the message, skip it, delete it or store it.

As the user cannot see an organized presentation of meta data (such as sender name or phone number, arrival time, or length) for the voicemail messages, the user cannot easily select desired messages to access—particularly when a large number of voicemail messages are present. Time is wasted considering each message sequentially and deciding whether to store, skip or delete it. Specifically, some time elapses as the user listens to at least some portion of the message before moving on to the next, even when deciding not to listen to the entire voice message.

Additionally, there is no way to easily see which messages are received from the same sender, and how long the messages may be.

The user is also not able to see voice messages that he may have left for others. It would be very advantageous to be able to see the interrelationships between messages received and messages sent as some of the sent and received messages may form a chain, or a thread.

To overcome these and the other related disadvantages noted above, an exemplary embodiment of a voicemail system incorporates an answering machine on handheld device 200.

To operate handheld device 200 as an answering machine, in one embodiment, microprocessor 228 stores network-encoded audio data received through communication subsystem 270 and voice communication module 230A, in local memory (e.g., RAM 218, flash memory 216 or a new block of memory). As noted above, the format of the network-encoded audio data would be compliant with a suitable standard defined for the voice and data communication network 110 used. In an exemplary embodiment, an AMR-WB encoded audio data compliant to the ITU-G.722.2 standard, may be received over a GSM voice and data communications network and stored in local memory.

During playback of recorded audio messages, microprocessor 228 may be used to decode network-encoded audio stored in local memory and output the decoded audio message through speaker 211.

In another embodiment, handheld device 200 may be loaded with separate audio codec software different from the speech codec used for network-encoded audio data. The audio coder portion of the codec software may be used to encode either decoded audio data received via the communication system 270 or raw digital audio data from microphone 212 in a compressed format suitable for storage (rather than transmission). The audio decoder may be used to decode compressed audio data encoded by the audio encoder and output the resulting audio to interconnected speaker 211.

In an alternate embodiment of the above, the audio codec may be formed as a dedicated hardware module (not shown), coupled to local memory (RAM 218, flash memory 216 or a new block of memory), microprocessor 228, communication system 270, microphone 212, and speaker 211, and incorporated into handheld device 200 to reduce the computational load on microprocessor 228. The audio coder may employ a compression engine to reduce the size of audio files written to local memory. Most audio compression schemes discard some data from raw digitized audio input to reduce the amount of memory required to store the audio data. When a compression engine is used by a codec, a corresponding decompression engine should used by the decoder to play back the audio. Audio codecs that use standardized compression/decompression techniques are well known in the art. The audio coder may thus accept decoded audio after the network-encoded audio data is decoded by a speech decoder (e.g., AMR-WB decoder) and compress the decoded audio data into a format suitable for storage in local memory. Conversely, the audio decoder may read compressed audio data from memory, decompress and output the corresponding audio signal to speaker 211.

Many file formats suitable for storing audio are known. Examples include MP3, WAV, AIFF and WMA formats. MP3 denotes the moving pictures expert group (MPEG) audio layer 3 standard, and has become extremely popular with users of personal computers and portable digital music players. WAV is short for waveform audio format, while the WMA stands for Windows Media Audio format which is a popular but proprietary standard. AIFF stands for the Audio Interchange File Format and is often used to store uncompressed audio data on personal computing devices.

In yet another embodiment, incoming network-encoded audio data is first decoded and then stored in local memory in a format suitable for outputting to speaker 211 after digital-to-analog conversion.

In operation, handheld device 200 may receive, store and present voicemail messages. The presentation may be very similar to the presentation of other messages such as emails, short messaging service (SMS) messages—also known as text messages—or multimedia messaging service (MMS) messages.

After a handheld device 200 rings for a predetermined (configurable) number of times, handheld device 200 enters answering-machine mode. Once handheld device 200 enters answering-machine mode, the caller is prompted to leave a message. If the caller proceeds to leave a message, microprocessor 228 may store the incoming message in local memory. The incoming message may be stored as network-encoded audio data (e.g., AMR-WB encoded data), or as decoded raw audio data suitable for digital-to-analog conversion; or as an audio file after decoding the received network-encoded audio and re-encoding the audio data (e.g., an MP3 file).

Handheld device 200 may alternately enter answering-machine mode if the user chooses to ignore an incoming call (by appropriate selection from a menu that may pop up on receipt of a new call) or if the user configures device settings on the handheld device 200 so that upon reception of a phone call, handheld device 200 automatically enters answering-machine mode. Various other methods of entering answering-machine mode will be apparent to those of ordinary skill in the art.

Once the caller leaves a message and hangs up, a message record associated with the incoming message (stored as an audio file) may be created by microprocessor 228 and displayed to the user in a user interface screen 600 shown in FIG. 6. Optionally, where a user calls out and leaves a voicemail message on a remote voicemail system, an outgoing message record may be created. In addition, microprocessor 228 may concurrently record the outgoing message in local memory of the handheld device 200.

In the depicted exemplary embodiment, the presentation of a voicemail message looks very similar to the presentation of an email message received using email client software. Title bar 602 displays the date. Each message record 604A, 604B, 604C . . . 604K (individually and collectively message records 604) represents a message which may be an email, SMS message or voicemail. Information regarding the sender, recipient, and time of arrival may be shown in a corresponding field in each record.

Each icon 606A, 606B, 606C . . . 606K (individually and collectively icons 606) which is part of a message record may be designed so as to indicate the type and status of the associated message. For example, unread emails may be indicated by a closed envelope icon 606D, while those that have been read may show an opened envelop icon 606C. Those with attachments may be indicated by an icon such as icon 606A showing an image of a paper clip. A voicemail message received and stored on the handheld device 200 may be represented by an icon 606F, such as a downwardly drawn handset while a different icon 606B with a similar look and feel (e.g., an upwardly drawn handset) may represent a message left by the user of the handheld device 200 on a recipient's remote voice mailbox.

To access voice messages, the user selects or opens a message record containing a voicemail message. For example, selecting message record 604F causes the stored audio message associated with message record 604F to be decoded as necessary, converted to an analog signal and output to speaker 211 by microprocessor 228. Where handheld device 200 employs a separate audio codec, the corresponding audio decoder may be involved in decoding the audio message from memory prior to outputting it to speaker 211. Once the voicemail message audio file is played, the corresponding icon may change to reflect that the voicemail message has already been played. For example, an icon may appear red if not yet played and green if previously displayed. Configuration options may also be provided for the user to manually change the icon associated with the state of a voicemail message as desired.

Advantageously, opening a message record corresponding to an outgoing voicemail (e.g., message record 604B) plays the stored audio file, thereby allowing the user to hear the outgoing message left on a remote voicemail system.

Consider the scenario where a caller (e.g., David) leaves a message for the user (e.g., Scott) of handheld 200 at time t1 (e.g., at 7:00 PM). This is shown in message record 604K of FIG. 6. The user then calls back and leaves a message at the original caller's (David's) voicemail box at time t2 (e.g., at 8:30 PM) as shown in message record 604G of FIG. 6. The original caller (David), after receiving the message, again calls. However, the user does not answer and the handheld device 200 goes to answering-mode. Hence, the caller (David) leaves a message at time t3 (e.g., 8:45 PM) as shown in message record 604F of FIG. 6. The user then calls again at time t4 (e.g., 10:15 PM) as depicted in message record 604B. These exchanges take place within the context of other message exchanges such emails and SMS messages being received and sent in the intervals between times t1, t2, t3, and t4.

As already seen, in one exemplary embodiment, the messages may be arranged as depicted in FIG. 6, chronologically—in their order of arrival or transmission. In alternate embodiments however, the messages may be presented as threads showing the interrelationships between messages.

Accordingly, FIG. 8 displays a different presentation of a user interface for the messages shown in FIG. 6 which depicts audio message associations or interrelationships in scenarios such as the voicemail exchanges described above.

User interface screen 800 includes message records 804A, 804B, 804C . . . 804K (individually and collectively message records 804) each with its corresponding icon 604A, 604B, 604C . . . 604K respectively. Some message records, such as message record 804B, have message sub-records 806A, 806B, and 806C which are listed under (or, more generally, positioned adjacent to) their 'parent' message record 804B. Message sub-records 806A, 806B, and 806C may be presented indented with respect to their parent message 804B, to show the association. In the particular embodiment depicted, a message sub-record is also shown as a message record in its own right. For example, message record 804F is the same as message sub-record 806A.

It is worth noting that the message contents stored in handheld device 200 are the same in both FIG. 6 and FIG. 8. Hence icons 606 as well as the fields (i.e., subject, sender, recipient, time and the like) associated each message record 804A, 804B, 804C . . . 804K are the same in both cases. However, in FIG. 8 the interrelationship of the voicemail messages is more readily apparent to a viewer.

In the above noted scenario of voicemail exchanges, the first voicemail message received at time t1 (7:00 PM) is displayed in message record 804K. As will become apparent, the same voice message also corresponds to message sub-records 806E, 806F and 806C. After the user calls back and leaves a message at time t2 (8:30 PM), a new message record 804G is displayed. As the previous message (corresponding to message record 804K) is related to the current message, a new message sub-record 806F is created and shown below message record 804G. Message sub-records are indented to show the relation visually to the parent message record. Thus it is clear, for example, that sub-record 806F is related to message record 804G.

When the user again receives an incoming voice message at time t3 (8:45 PM), the received voicemail message is shown as message record 804F. The previous related messages are also shown as message sub-records 806D, 806E (corresponding to message records 804K, 804G respectively).

The next call from the user at time t4 (10:15 PM) is shown as message record 804B. Again, the previous related messages are also shown as message sub-records 806A, 806B, 806C (corresponding to audio message records 804K, 804G, 804F, respectively).

Advantageously, in FIG. 8, audio message record 804B and its message sub-records 806A, 806B and 806C are visually depicted in a manner that clearly illustrates the sequence of voicemail messages—or the thread of exchanges.

It will be appreciated that wireless connectivity is not required to access the messages. Voice messages are instead accessed by simply selecting or opening a message record. Selecting a message sub-record 806A, 806B, 806C, or 804K plays the same audio file that would be opened by selecting its corresponding message record. For example selecting message sub-record 806C opens the same audio file as selecting message record 804K. In other words, one message file may be associated with a message record as well as multiple message sub-records.

Displaying the messages of FIG. 6 as voicemail threads as shown in FIG. 8 entails associating outgoing and incoming message records to form appropriate message groups that should appear together in a given thread.

Figure 7:
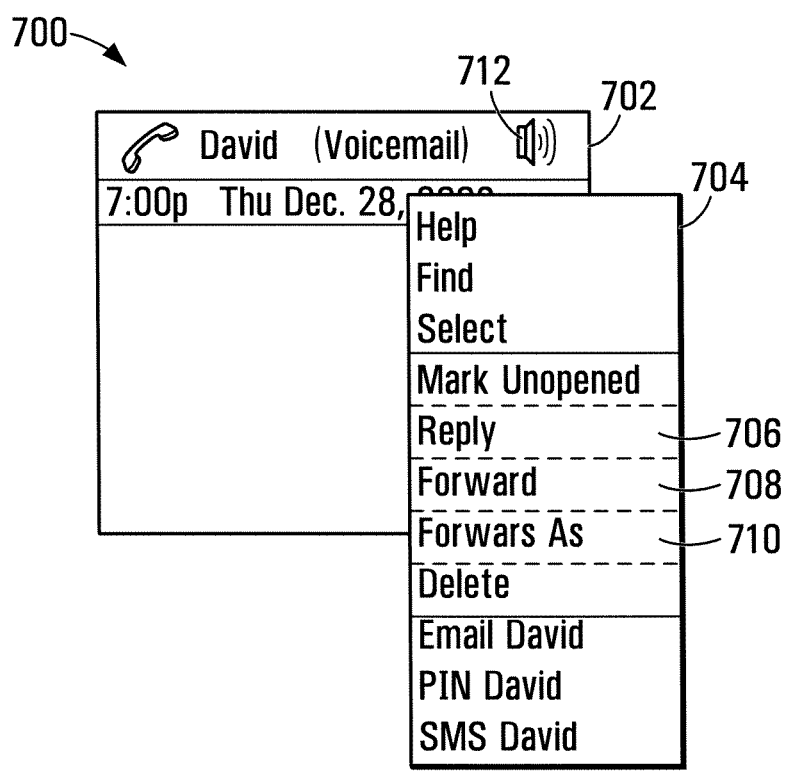
FIG. 7 is another screenshot of the user interface of FIG. 6, depicting a context menu presented after a voicemail message record is opened.

For example, the outgoing voice message at time t2 (of record 604G) may be associated with the incoming message at time t1 (of record 604K) as follows. When the user opens message record 604K a user interface screen 700 depicted in FIG. 7 may be displayed. User interface screen 700 may include a window 702 with an icon 712 indicating that a voicemail audio message is being played back. Window 702 may also include information available in message record 604K such as caller identification, and time of receipt of the audio message. While, and after, the user listens to the recorded audio message, a context based menu 704 may be displayed. Menu 704 may alternately be invoked using track ball 206. Menu 704 may include selections enabling the user to reply to the caller (e.g. selection 706), forward the audio message to another phone recipient (selection 708), or forward the audio message as an email attachment (selection 710), respectively. The user can navigate through the menu 704 using the track ball 206 and select a selection 706, 708, or 710. For example, if the user (Scott) chooses to reply to the caller (David) via selection 706 and connects to the original caller's (David's) remote voicemail, then microprocessor 228 may concurrently record the network-encoded outgoing message in local memory as it is left on the remote voicemail (at time t2) and create an outgoing message record 606G for it. If a separate audio codec is employed, the outgoing message may instead be recorded using a desired file format such as WAV or MP3 or the like. Outgoing message record 606G is then associated with incoming message record 604K.

Connection to a remote voicemail system may be detected by handheld 200 using answering machine detection (AMD) software executing on its DSP 258 or microprocessor 228. Answering machine detection software may utilize DSP algorithms to analyze the received voice response to determine if the source is a live person or an answering machine. For example a live person typically answers by a short greeting such as "Hello" or "David speaking" while an answering machine or a voicemail system typically uses a much longer, more informative greeting such as "You have reached the voicemail of David. Please leave a message after the beep". Such differences may be exploited by AMD software to identify a remote voicemail.

It is also necessary to associate incoming message records with existing outgoing message records. In this regard, the following approach is suitable if the handheld device 200 of only one party to the call is fitted with the exemplary software.

Figure 9:
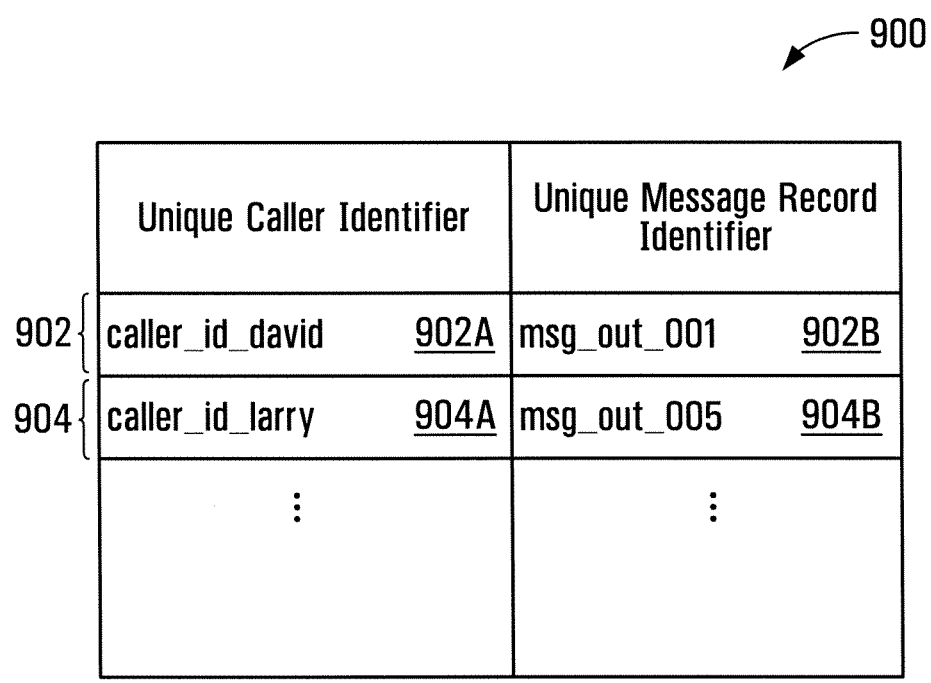
FIG. 9 is a block diagram of a database storing data associating callers with message records.

The handheld device 200 may store a unique caller id (such as a phone number or a personal identification number) and a corresponding unique message id (identifying the last outgoing message to the caller) in a database. An exemplary database 900 is depicted in FIG. 9. Each message record (in FIG. 6 or FIG. 8) would have a unique message id (e.g., 902B or 904B) assigned to it. Each caller would also have a unique caller id (e.g., 902A or 904A). The database may be a simple table formed in memory, a text file, a simple relational database management system (RDBMS) or the like. Each database entry 902 (or 904) thus contains a unique caller id 902A (or 904A) and the last outgoing message record id 902B (or 904B) awaiting a reply.

For example, entry 902 may contain a unique identifier 902A (caller_id_david) for David and a message record identifier 902B (msg_out_001) identifying the last outgoing message left by Scott for David. Subsequently, if an incoming call passes to voicemail and a message is recorded, database 900 is inspected to see if the incoming message originated from a recipient for whom an outgoing message had been left previously. That is, callers from whom an incoming message is expected would have corresponding entry 902, or 904 in database 900. If the caller is found in the database then an association is made between the last outgoing message record (whose message record id is stored in the database) and the new incoming message record.

Figure 10:
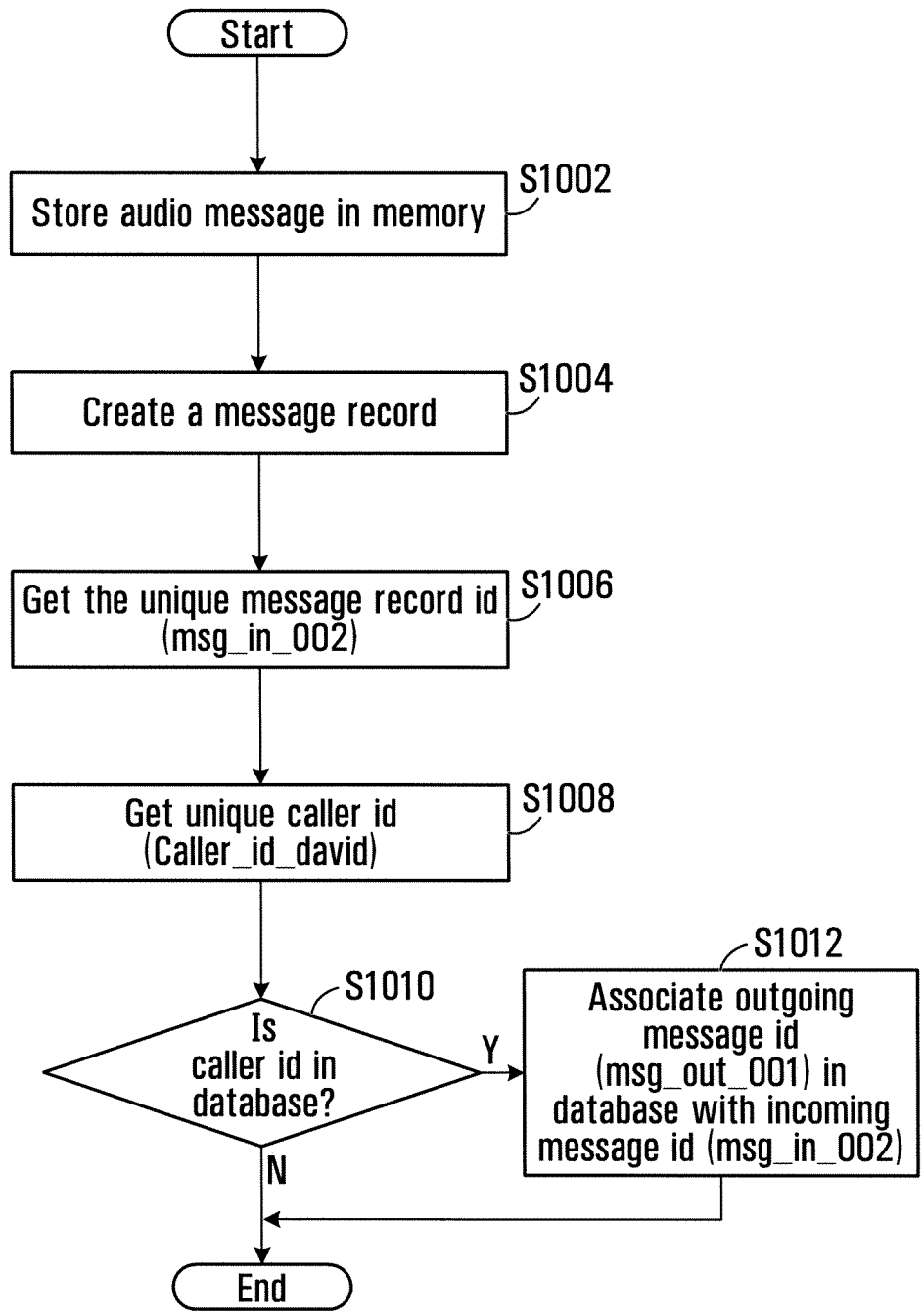
FIG. 10 is a flowchart depicting actions taken by the handheld device of FIG. 2 as an incoming call is passed to its voicemail system.

FIG. 10 depicts a flowchart outlining the actions taken by a handheld device 200 as an incoming call is passed to the voicemail system. After the voicemail message is recorded (S1002) an incoming message record is created for it (S1004). A unique message record id (e.g. msg_in_002) is then obtained (S1006) for the just recorded message. Similarly a unique caller id (e.g. caller_id_david) is obtained that uniquely identifies the caller (S1008). The database 900 is then queried (S1010) to determine if there is an entry containing the unique caller id (caller_id_david). If so, (S1012) an association is made between the outgoing message id in database 900 (e.g. msg_out_001) and the new incoming message id (msg_in_002). If no entry is found in the database 900 the new message would not be associated with an existing thread (S1012).

Figure 11:
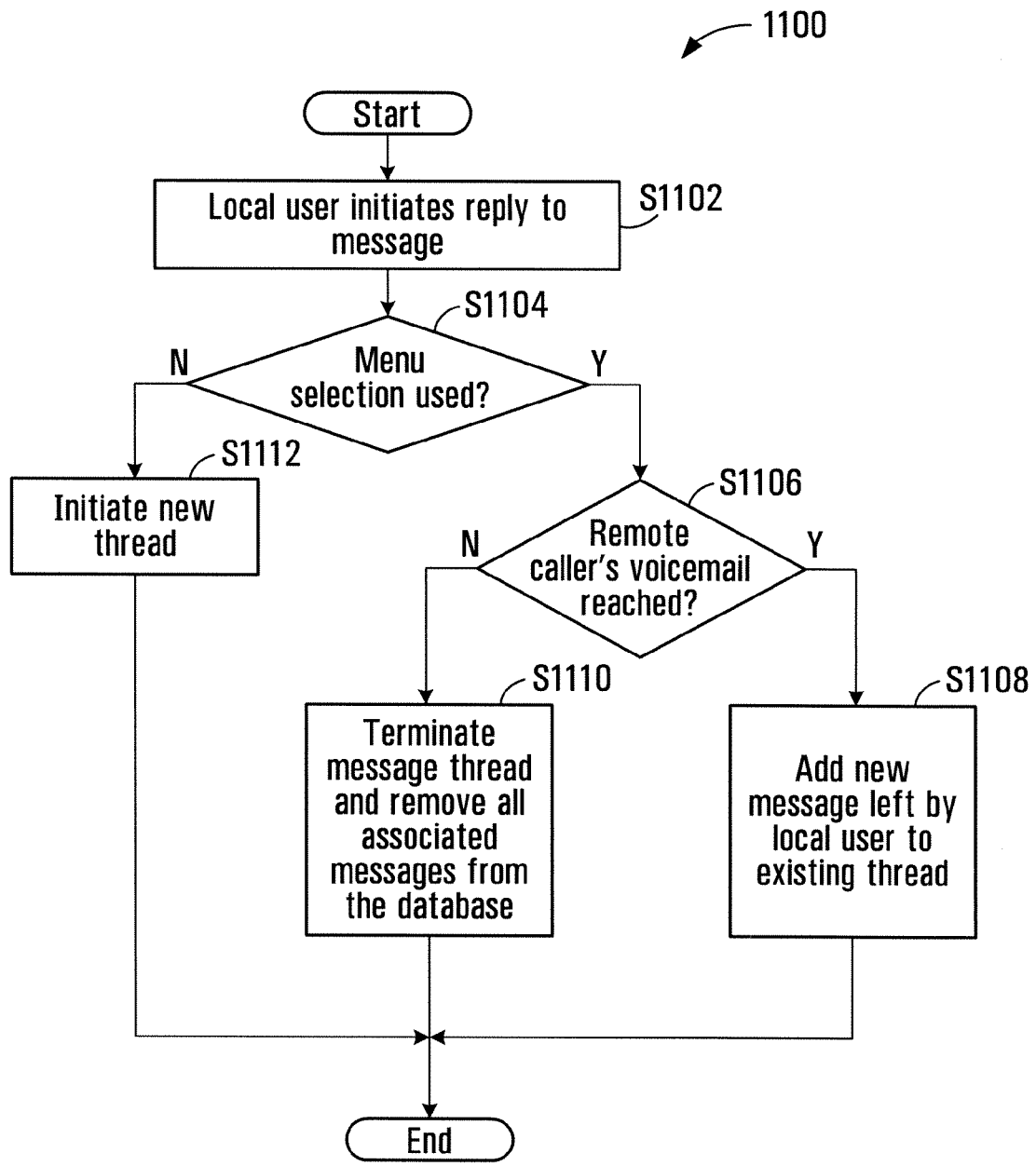
FIG. 11 is a flowchart depicting actions taken by the handheld device of FIG. 2 if the handheld user replies to a message.

FIG. 11 depicts a flowchart outlining the actions 1100 taken by a handheld device 200 when the handheld user replies to a message. If the local handheld user initiates a reply to a message (S1102) using a menu selection (S1104) and reaches the remote caller's voicemail (S1106), then the thread containing the message is extended by adding the new message left by the handheld user (S1108). If, instead, the call is answered by the remote recipient in person (as may be detected by, for example, using AMD software), the thread containing the message is terminated and all of the messages associated with the thread are removed from the database (S1110). For example, if a call by the handheld user (Scott) is answered by the remote recipient (David), the entry 902 (FIG. 9) containing the outgoing message record id (902B) for David is removed from database 900. Subsequent incoming or outgoing voice messages to/from the remote caller (David) may then initiate a new thread.

If the local handheld user calls a recipient in reply to a message but without using a menu option to initiate the reply (S1104), then the existing thread would not be extended and a new thread would instead be initiated (S112). Upon a subsequent reply by the remote caller, if the local handheld user picks up, then when the call is ended the handheld device 200 may present a menu selection of all active threads containing the remote caller's id and allow the local handheld user to terminate any existing thread.

In yet another embodiment, the remote caller may be prompted to enter a subject for the message being left on the local device. Threads would then be maintained based on subject, each message record in a thread corresponding to the same subject. Any new message would then be easily added to the appropriate thread, using its subject.

In a variation of the above exemplary embodiment, a speech-to-text conversion engine may be employed to save text data corresponding to incoming or outgoing messages. The text may be analyzed to determine an appropriate subject corresponding to each message record. The subject, so determined, may then be used to create or select an existing thread into which a new incoming or outgoing message record may be added. If no appropriate subject is found, then a new thread may be created.

In yet another simplified embodiment, the association of messages to form threads may be determined by comparing the originating phone number of an incoming message with the destination phone number of an outgoing message. For example, in FIG. 6 the caller's (i.e., David's) phone number of the message at time t1 is the same as the destination (i.e., David's) phone number of the message at time t2. In view of this match, message record 606G is associated with message record 604K. When the caller subsequently leaves a message at time t3, the originating phone number (David's phone number) may again be used to associate message record 606F with message record 606G. Once message records are associated as just described they may be presented as threads showing their interrelationships.

If both the local and remote handheld devices are operated using exemplary device code and software as disclosed herein, then message association data between an incoming message being left on a handheld device 200 and a previously recorded outgoing message, may be exchanged using voice communications module 230A (in-band) or using data communications module 230B (out of band). Thus in FIG. 6, when both handheld devices are equipped with suitable exemplary software, a current incoming message record (e.g. 606F) may be associated with a previously recorded outgoing message record (e.g. 606G) using exchanged message association data. In one embodiment, message association data may include unique message record identifiers to be associated. In this case, a given voicemail message may have an outgoing message record with a unique message record id (on the local handheld device). The same message would be recorded as an incoming message record with a unique message record id in the remote handheld device. These two message record ids may be associated. Alternately, the outgoing message record id on the local handheld device may be the same as the incoming message record id on the remote handheld device. In other words, while a message record id is unique in a given (local) device, it may be also in use by another (remote) handheld device to facilitate association of messages.

In one in-band implementation, the beep at the end of a voicemail prompt may be a unique sound or a series of tones, advertising the fact that the handheld device 200 is operating using the before described device code and its software supports voicemail threading. Upon detecting such unique tones, the calling handheld device 200 may be prompted to transmit message association data for the current message being left on the voicemail system.

If both the calling and recipient handheld devices are operated using exemplary device code and software as disclosed herein, the recipient handheld device 200 may transmit (in-band) another unique sound or series of tones when prompting for a message, to advertise the fact that its voicemail system is being used. The unique sound or tones allow the calling handheld device 200 to easily determine that it is connected to a remote voicemail system, thereby avoiding the need for answering machine detection software. Alternately, the recipient handheld device 200 may transmit out-of-band data to the calling handheld device 200 to announce that the recipient handheld device 200 is in answering-machine mode.

In alternate embodiments, threads may be displayed differently from the arrangements depicted in FIG. 6 and FIG. 8. For instance, the thread ending with the most recent voicemail message may be the only thread shown for the sub-records of the thread. Such presentation options may be provided as preference settings on handheld device 200. For example, in FIG. 8, both message record 804F and sub-message record 806A correspond to the same incoming audio message (from David at 8:45 PM). Thus, in an alternate embodiment, only message sub-record 806A may be shown while omitting message record 804F.

One of the advantages of the embodiments described above is the cost savings in using handheld device 200 as an answering-machine in lieu of having a voicemail service contract with the network provider. Network provided voicemail service has an associated periodic fee (usually charged monthly) which may be conveniently eliminated by the use of an audio codec in handheld device 200 to record and playback messages.

Furthermore, the user of handheld device 200 can easily choose which audio messages to listen to without the cumbersome practice of having to listen to voice instructions and key in answers. Using the embodiments described, a voice message may be treated like any other message such as an email or a text message. Voicemail messages can thus be forwarded by email, or stored onto a removable media such as CD or USB memory card or the like. In addition, since voicemail messages are stored as files, a user may conveniently skip ahead or back to anywhere within the voicemail message and listen to any portion of the recorded audio message.

As shown in FIG. 6 and FIG. 8, it is clear that the phone number of a caller can be substituted by caller identification. The caller identification may come from a calling party name display (CPND) service provided by the network or from a translation by the address book of the handheld device 200. This allows more intelligible or friendly names to be displayed in each audio message record (FIG. 6, FIG. 8) rather than phone numbers. In yet another exemplary embodiment, the speech-to-text conversion engine can scan the voicemail message and extract specific data relating to caller identification such as the telephone number of the caller. Alternatively, the specific data may be mapped to other information in memory 216 such as the address book. For example, a telephone number in a voicemail message extracted by the speech-to-text conversion engine can be compared with the contact list in memory 216 to determine the caller identification associated with the telephone number in the contact list and display the caller identification in sender id field 308C as depicted in FIG. 3.

Various options to display either full formal names, nick names, phone numbers or the like are known and may be instituted for the voicemail system as disclosed in the embodiments above.

Of course, the above described embodiments are intended to be illustrative only and in no way limiting. The described embodiments are susceptible to many modifications of form, arrangement of parts, details and order of operation. The disclosed embodiments are rather intended to encompass all such modification within the scope, as defined by the claims.

What is claimed is:

1. A method of providing a voicemail service at a handheld wireless device comprising:
   recording an incoming audio message in a local memory of said handheld device; and
   displaying an incoming audio message record, corresponding to said incoming audio message, in a user interface screen of said handheld device, said user interface screen contemporaneously presenting email message records along with said incoming audio message record;

and further comprising:
(i) placing a call to a recipient;
(ii) determining that said call is answered by a remote voicemail system;
(iii) transmitting an outgoing audio message to said remote voicemail system; and
(iv) displaying in said user interface screen an outgoing message record for said outgoing audio message.

2. The method of claim 1, further comprising, upon selection, of said incoming audio message record through said user interface of said handheld device, playing back said incoming audio message recorded in said local memory through a speaker of said handheld device.

3. The method of claim 2, wherein said recording comprises:
(i) taking digital voice samples using, an audio codec coupled to said local memory and a wireless receiver in said handheld device;
(ii) compressing said voice samples; and
(iii) writing compressed voice samples into said local memory.

4. The method of claim 3, wherein said compressed voice samples are written in said local memory using MP3 audio file format.

5. The method of claim 3, wherein said playing back comprises:
(i) reading compressed voice samples from said local memory;
(ii) decompressing said compressed voice samples using said audio codec; and
(iii) outputting said decompressed samples in said speaker.

6. The method of claim 5, wherein said audio codec comprises an MP3 player.

7. The method of claim 1, further comprising recording said outgoing audio message in said local memory.

8. The method of claim 7, further comprising selectively associating said outgoing message record with said incoming message record.

9. The method of claim 8, further comprising:
comparing a phone number called to leave said outgoing audio message with an originating phone number associated with said incoming audio message record and upon a match, associating said outgoing message record with said incoming message record.

10. The method of claim 8, wherein said remote voicemail system comprises a remote handheld device, said method further comprising exchanging message association data with said remote handheld device to associate said outgoing message record with said incoming message record.

11. The method of claim 8, further comprising:
(i) storing a first unique caller identifier corresponding to a recipient of said outgoing audio message in association with said outgoing audio message;
(ii) upon receiving a new incoming message, recording said new incoming message and creating a new message record, and comparing a second unique caller identifier for an originator of said new incoming message with said first unique caller identifier; and
(iii) on a match, associating said outgoing message record with said new message record.

12. The method of claim 8, further comprising positioning said incoming audio message record corresponding to said incoming audio message on said screen adjacent to said outgoing message record.

13. The method of claim 8, wherein said incoming audio message record is visually presented as a sub-record of said outgoing message record corresponding to said outgoing audio message.

14. The method of claim 1, further comprising:
upon a user selecting said incoming audio message record through said user interface, enabling said user to select to reply to an original caller of said audio message; and
upon said user selecting to reply:
while said user leaves an outgoing audio message in a remote voicemail, concurrently recording said outgoing audio message in said local memory;
creating an outgoing message record for said outgoing audio message; and
associating, said outgoing message record with said incoming audio message record.

15. The method of claim 1, wherein said incoming audio message record comprises a caller identification field.

16. The method of claim 15, wherein said incoming audio message record comprises a time field.

17. The method of claim 1, further comprising, upon receiving a phone call from a caller, placing said handheld device in answering-machine mode prior to said recording.

18. The method of claim 17, further comprising, entering said answering-machine mode upon receipt of a user input to ignore an incoming phone call.

19. The method of claim 17, further comprising, automatically entering said answering-machine mode responsive to a user setting, upon receipt of incoming phone calls.

20. The method of claim 1, wherein said user interface screen of said handheld device also presents text message records along with said audio message record.

21. The method of claim 1 wherein said determining comprises automatically detecting.

22. A method of providing a voicemail service at a wireless handheld device, comprising:
recording an incoming audio message for an original caller in a local memory of said handheld device; and displaying an incoming audio message record corresponding to said incoming audio message in a user interface screen of said handheld device;
upon a user selecting said incoming audio message record through said user interface, enabling said user to select to reply to said original caller; and
upon said user selecting to reply being connected to voicemail and leaving an outgoing audio message:
recording said outgoing audio message in said local memory;
creating an outgoing message record, for said outgoing audio message; and
associating said outgoing message record with said incoming audio message record.

23. The method of claim 22, wherein said associating comprises positioning said incoming audio message record on said user interface screen adjacent to said outgoing message record.

24. A handheld device comprising:
a wireless receiver;
a speaker;
memory;
a display;
and a processor, operable to:
(i) upon receiving a phone call from a caller, transition said device to answering-machine mode and record an incoming audio message from said caller in said memory; and (ii) display an incoming audio message record corresponding to said audio message in a user interface screen on said display, said screen contemporaneously presenting email message records and said incoming audio message record; and further comprising a microphone and wherein said processor is further operable to record on said memory using said microphone, an outgoing audio message left on a remote voicemail system.

25. The device of claim 24, wherein said processor is further operable to play back said incoming audio message through said speaker upon selection of said message record by a user.

26. The device of claim 24, further comprising an audio codec.

27. The device of claim 24, wherein said processor displays text message records contemporaneously with said incoming audio message record.

28. The device of claim 24, wherein said user interface screen displays an outgoing message record corresponding to said outgoing audio message.

29. The device of claim 24, further comprising a digital signal processor (DSP) in communication with said processor.

30. The device of claim 29, wherein said DSP executes answering machine detection software.

\* \* \* \* \*